United States Patent
Dintelmann et al.

(10) Patent No.: US 6,256,496 B1
(45) Date of Patent: Jul. 3, 2001

(54) DIGITAL RADIO COMMUNICATION APPARATUS AND METHOD FOR COMMUNICATION IN A SATELLITE-SUPPORTED VSAT NETWORK

(75) Inventors: Friedrich Dintelmann, Reinheim; Gerd Ortgies, Darmstadt; Friedrich Ruecker, Eich; Dirk von Hugo, Darmstadt, all of (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 08/814,142

(22) Filed: Mar. 10, 1997

(30) Foreign Application Priority Data

Mar. 9, 1996 (DE) .............................. 196 09 235

(51) Int. Cl.$^7$ ....................................... H04Q 7/20

(52) U.S. Cl. ..................... 455/427; 455/12.1; 455/430

(58) Field of Search ................................. 455/12.1, 13.1, 455/13.4, 67.1, 67.4, 101, 423, 427, 430, 507, 509; 348/14, 15, 16; 701/13

(56) References Cited

U.S. PATENT DOCUMENTS

| 4,639,937 | 1/1987 | McRae et al. . |
| 4,731,866 | * 3/1988 | Muratani et al. ....................... 455/10 |
| 4,941,199 | 7/1990 | Saam . |

(List continued on next page.)

FOREIGN PATENT DOCUMENTS

| 3210298 | 11/1990 | (DE) . |
| 0 346 868 | 12/1989 | (EP) . |
| 0 411 538 | 2/1991 | (EP) . |
| 6-53878 | 2/1994 | (JP) . |
| 96/04718 | 2/1996 | (WO) . |
| 96/15601 | 5/1996 | (WO) . |

OTHER PUBLICATIONS

J. Posecker, "Der Telekom–VSAT–Service–Eine Bilanz ein Jahr danach", ntz. Bd. 44,1991.
G. Mocker, "VSAT–Pilotsystem fur Satellitengestutzte Datenubertragung" ntz. Bd. 43, 1990.
G. Mocker, "VSAT–Pilotsystem für satellitengestützte Datenübertragung." In: ntz, Bd. 43, 1990, H.2, S.68–72.*
Sited in the attached search report.
J. Posecker, "Der Telekom–VSAT–Service—Eine Bilanz ein Jahr danach., " In: ntz, Bd. 44, 1991, H. 4, S.246, 248–250, 252–255.

Primary Examiner—Nay Maung
(74) Attorney, Agent, or Firm—Kenyon & Kenyon (57) ABSTRACT

An improved digital radio communication apparatus and method for communicating in a satellite-supported VSAT network consisting of a plurality of VSAT member stations and at least one central station or hub. Both the apparatus and method concern VSAT systems performing voice, video and data communication in meshed networks comprising at least one central station or hub and VSAT stations via a satellite. The hub sends its information via at least one of its earth stations to the VSAT stations and receives at other frequencies the messages sent by the VSAT stations. Transmission frequencies and allowable overall bit rates are established by the hub as a function of the propagation conditions prevailing on the individual satellite paths. Member traffic is classified as time-critical traffic (ZKV) or non-time-critical traffic (ZUV). A hub comprises two or more earth stations or diversity stations linked by a terrestrial line with traffic always conducted via the earth station or diversity station suffering the least propagation effects and/or system component failures. The central station or hub assigns the individual members, upon request, a secure frequency, at which higher transmission quality is achieved due to lower intermodulation interference, with this assignment possibly referring to a narrow-band transmission channel through which direct telephone traffic can be conducted between two members, avoiding double hop.

16 Claims, 7 Drawing Sheets

U.S. PATENT DOCUMENTS

| | | | |
|---|---|---|---|
| 5,128,942 | | 7/1992 | Kojima . |
| 5,161,194 | * | 11/1992 | Ujiie ................................... 370/316 |
| 5,204,981 | | 4/1993 | Karasawa et al. . |
| 5,295,138 | * | 3/1994 | Greenberg et al. .................. 455/62 |
| 5,303,286 | * | 4/1994 | Wiedeman ......................... 455/12.1 |
| 5,404,375 | * | 4/1995 | Kroeger et al. ..................... 455/12.1 |
| 5,625,624 | * | 4/1997 | Resen et al. ........................ 370/316 |
| 5,659,487 | * | 8/1997 | Cho et al. .......................... 455/12.1 |
| 5,758,261 | * | 5/1998 | Wiedeman .......................... 455/427 |
| 5,887,257 | * | 3/1999 | Olds ................................... 455/12.1 |

* cited by examiner

DIGITAL RADIO COMMUNICATION APPARATUS AND METHOD FOR COMMUNICATION IN A SATELLITE-SUPPORTED VSAT NETWORK

FIELD OF THE INVENTION

The present invention concerns an apparatus and method for improved digital radio communication in a satellite supported VSAT network consisting of a plurality of VSAT member stations and at least one central station (hub).

BACKGROUND INFORMATION

Digital data, voice and video communication within closed user groups with a central structure (companies with subsidiaries, retail chains with many affiliates, mainframe systems with several user levels) can be advantageously operated using radio communication via satellites. The switching and organization functions in these networks are carried out by a central station (hub). The antenna size and transmission power of the hub are considerably greater than those of the other member stations. Since member stations' satellite dishes usually have a very small diameter (Very Small Aperture Terminal, VSAT), such a satellite network is usually referred to as a VSAT network. A description of a typical VSAT network is given in Supplement 3, "Handbook on Satellite Communication: VSAT Systems and Earth Stations," ITU-R, Geneva 1994, which is hereby incorporated by reference herein.

The data flow from the hub to the VSATs (outroute) is received by all the members in the network; the signals sent by the individual VSATs (inroute) are usually of a lower speed and can only be correctly received by the hub due to the limited size of the VSAT stations. Communication between VSAT stations usually takes place via the central station (hub), referred to as a double hop, which causes an additional up to half-second delay in the signal transmission time due to the great distance to the satellites.

A specific advantage of such VSAT networks includes the fact that messages destined for a plurality of members need to be sent only once and can be received by all destinations simultaneously. By installing the communication equipment in the immediate proximity of the user, complex routing over several switching stations can be avoided, which can be considerable especially for international terrestrial communications.

Due to the signal attenuation caused by atmospheric effects, typical for radio frequencies higher than 10 GHz, a certain power margin must be provided when operating such systems, so communications do not immediately break down when attenuation occurs. In order to guarantee 99.5% availability over a year, this margin must be approximately 2–3 dB for the currently common "Ku band" transmission frequencies of 12–14 GHz. This margin is permanently built in through the dimensioning of the satellite network and therefore cannot be used for other transmission purposes in today's systems during the greater part of the year, when atmospheric path attenuation is much lower than the margin provided.

By providing a satellite link within a satellite-supported network with an inflexible fixed attenuation margin, a certain degree of reliability (availability) is achieved at the expense of system economy.

SUMMARY OF THE INVENTION

A basic object of an exemplary embodiment of the present invention is to provide an apparatus and method for improved digital radio communication in a satellite-supported VSAT network between members of a closed group, wherein the existing margins can be put to additional use in the case when path attenuation is lower than the margin provided, in order to operate more economically and to achieve more efficient utilization of the equipment required for operating the central station.

This can be achieved by an exemplary embodiment of the present invention through an apparatus of a VSAT network comprising at least one central station (hub), a plurality of VSAT stations, and a satellite, where the central station (hub) further comprises a plurality of earth stations arranged clearly separated from one another, each having an antenna and transmission equipment in the radio frequency range, and having a terrestrial line link existing between the earth stations and a central station (hub) control unit (computer).

This can also be achieved by an exemplary method of the present invention comprising a plurality of VSAT member stations with at least one central station (hub) for voice, video, and data communication, wherein individual members or user groups can request telecommunication services, wherein in the exemplary method the member traffic is classified as time-critical traffic (ZKV) or non-time-critical traffic (ZUV) and where the transmission parameters of the satellite links are determined as a function of the propagation conditions on the individual communication paths by the central station (hub).

An advantage of an exemplary embodiment of the present invention includes the fact that the available reserves can be used for other purposes when path attenuation is lower than the reserve provided, which allows for more economical operation. For this purpose, the proposed improved VSAT system uses different transmission methods allowing maximum utilization of the available satellite capacity, depending on the propagation conditions at the time. This is achieved through special measures for compensating atmospheric attenuation (Fade Counter Measures, FCM), some of which are known in principle, but not yet proposed in this combination for use in satellite networks. The prerequisites for the effective use of some of these measures include the physical separation of the individual VSAT stations of the network, so that simultaneous rain-induced attenuation at different locations is unlikely due to the limited area affected by strong rain events.

The concept of the novel VSAT system proposed here (apparatus and method) also provides more effective utilization of the equipment needed for the central station (hub), since a single central station (hub) is jointly used by a plurality of user groups, for example, by accessing different separate and independent signals from the central station (hub). Furthermore, replacing a known complex earth-based station having a large antenna at the central station (hub) with two or more simpler earth-based sub-stations having smaller antennas provides greater security and availability of the networks.

The use of the apparatus and method of the present invention allows the current quality standard to be met using less expensive equipment with less reserve capacity or more members to be served by the same satellite and equipment resources, or the quality standard to be raised with an unchanged number of members and equipment characteristics. In addition, the normally strict technical requirements for a single VSAT network central station (hub) can be considerably reduced by using two or more physically separated earth-based sub-stations linked by a terrestrial line.

DETAILED DESCRIPTION

Figure 1:
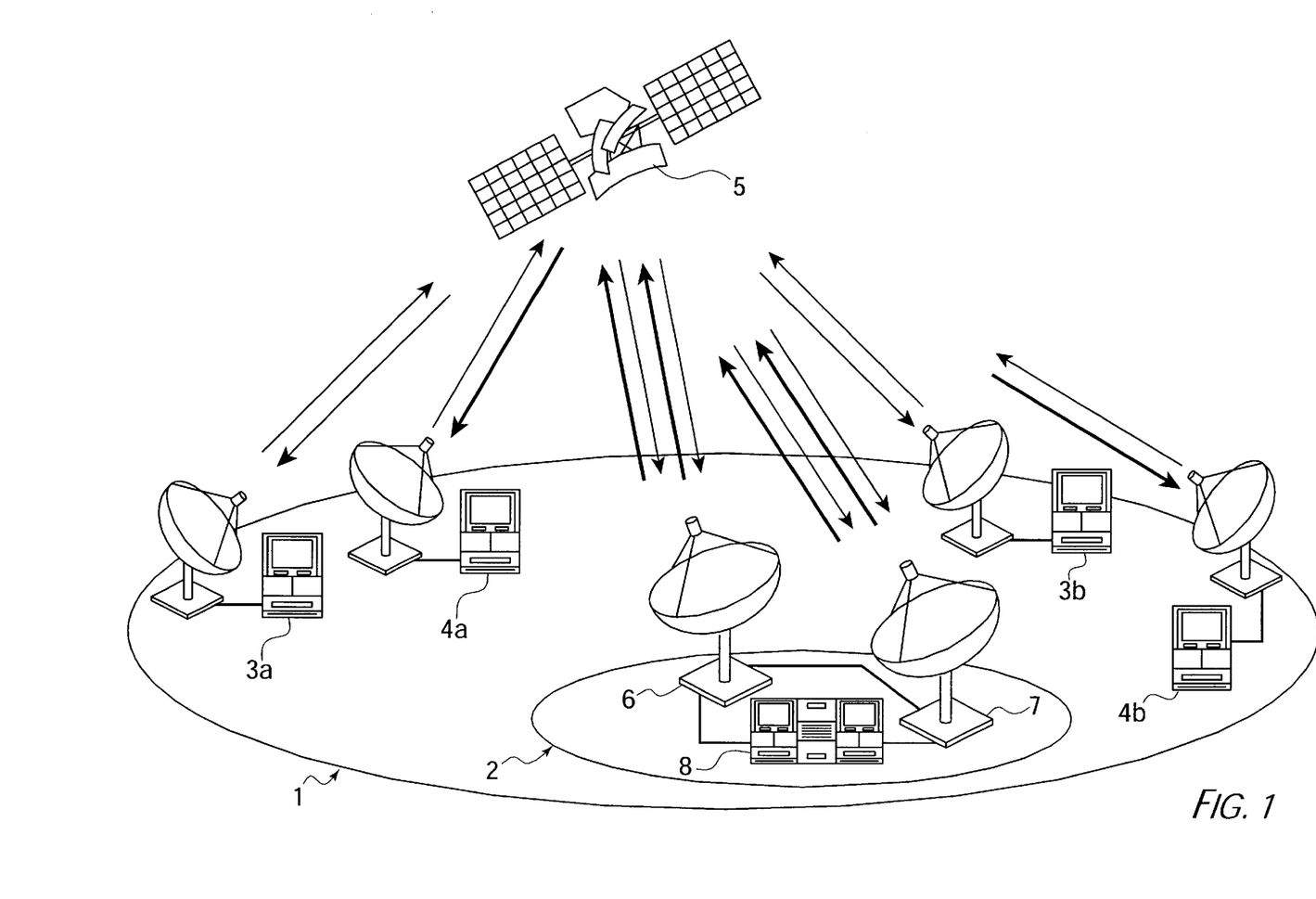
FIG. 1 shows the typical structure of the VSAT system according to an exemplary embodiment of the present invention.

The transmission system schematically represented in FIG. 1 includes a VSAT network 1. VSAT network 1 comprises a central station (hub) 2, a plurality of VSAT stations 3a, 3b, 4a, 4b, and a satellite 5. The same network may have different independent subgroups, represented by stations 3a, 4a and by stations 3b, 4b. The transmission parameters of the satellite links are determined by the central station (hub) 2 from the conditions prevailing on the individual communication paths. VSAT stations 3a, 3b, 4a, 4b are capable of receiving signals from the central station (hub) 2 at an agreed upon frequency.

The central station (hub) 2 may comprise one or more earth-based sub-stations 6, 7, which must be located at least approximately 15 km apart (for a what is hereinafter referred to as a "diversity configuration"). Each earth-based station comprises an antenna and radio frequency (HF, high frequency) transmission equipment. There is a terrestrial line connection between earth-based sub-stations 6, 7 and a central station computer (controller) 8. A higher operating reliability of the VSAT network 1 is achieved due to the physical distance between earth-based sub-stations 6 and 7, which operate in parallel, since in the case of a breakdown of communications through one of the earth-based sub-stations 6 or 7 due to equipment problems or attenuation, the network can be operated, at least in part, via the other station(s). The availability requirements for each individual earth-based sub-station 6, 7 are considerably lower than for operating the central station (hub) 2 through a single earth-based station; normally expensive equipment, characterized by the use of high-performance amplifiers, large spare parts inventories, and the need to adjust the antenna to compensate losses caused by diurnal satellite movements, is no longer needed. The "diversity configuration" makes large attenuation margins unnecessary. In the case of the diversity configuration, the earth-based sub-station (6,7) whose signals suffer the least attenuation operates as the "master hub".

The more affected station (reserve station) can also be used with the restrictions of lower long-term availability and reduced short-term transmission capacity. Thus, when distinction is made between time-critical traffic ZKV and non-time-critical traffic ZUV, only non-time-critical traffic ZUV takes place via the reserve station, while the master station handles mainly time-critical traffic ZKV.

Figure 2:
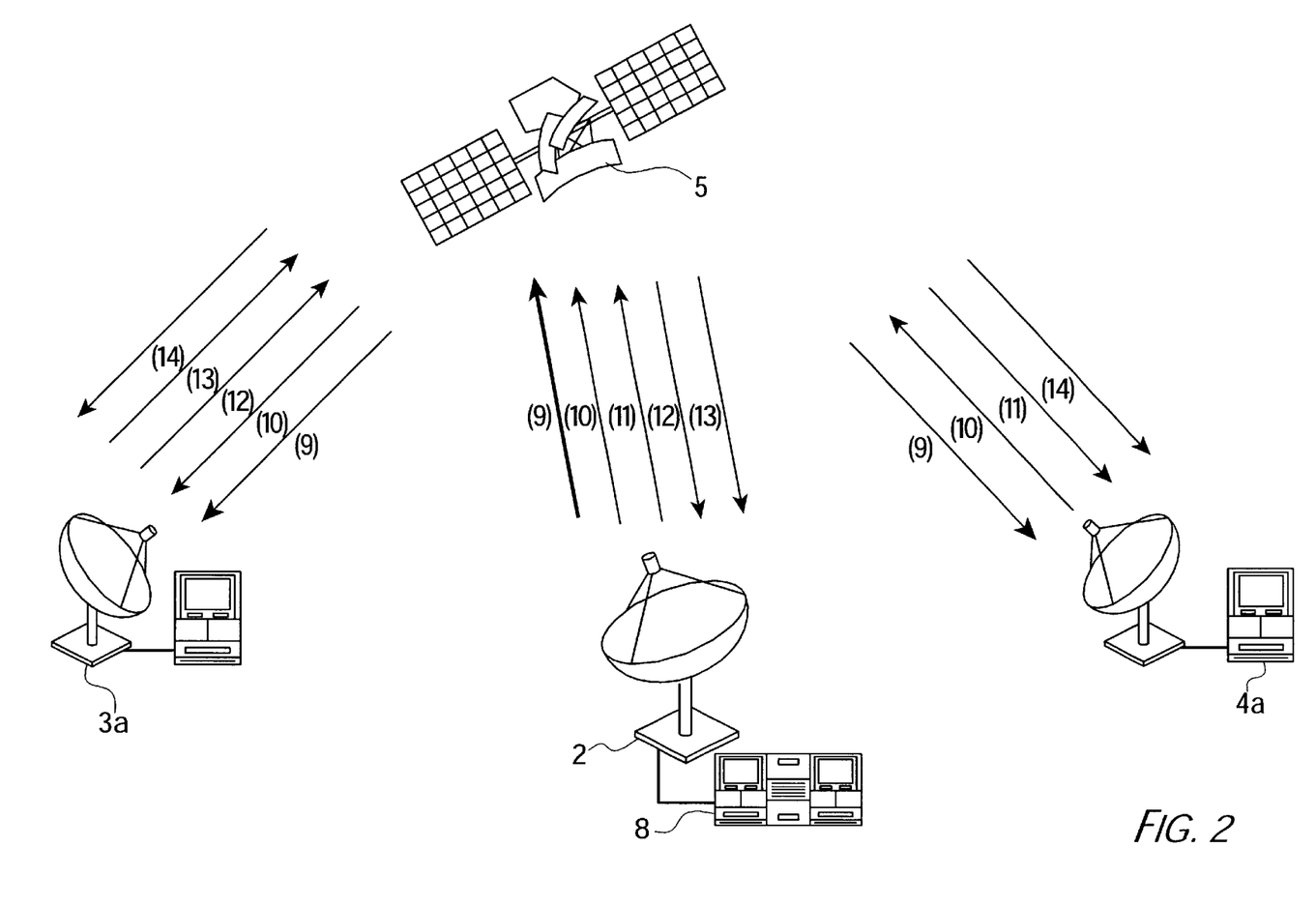
FIG. 2 shows the exemplary communication flow in a typical VSAT network.

The communication relationships within a VSAT network 1 between the central station (hub) 2 and VSAT stations 3a and 4a are represented in FIG. 2. The signals emitted by the central station (hub) 2 are referred to as outroute signals, whereas signals received by the central station (hub) 2 are referred to as inroute signals. Outroute signals include the central station's (hub's) system information 9, data and audiovisual information 10 from the central station computer 8, as well as forwarded information 11 forwarded by the central station (hub) 2 from the other VSAT stations 3a, 3b, 4a, 4b. The system information 9 contains the specific transmission parameters such as frequency, bit rate, error detection and correction procedures, and block size required for sending messages to the other members of the network (the inroute signals). The inroute signals comprises data and/or audiovisual information 12 sent from the VSAT stations to the central station (hub) 2, data information 13 sent from one VSAT station to other VSAT stations via the central station (hub) 2, or low-speed direct telephony 14 between VSAT stations without double hop, which is accomplished after calling the central station (hub) 2 via a dedicated narrow-band channel.

Figure 3:
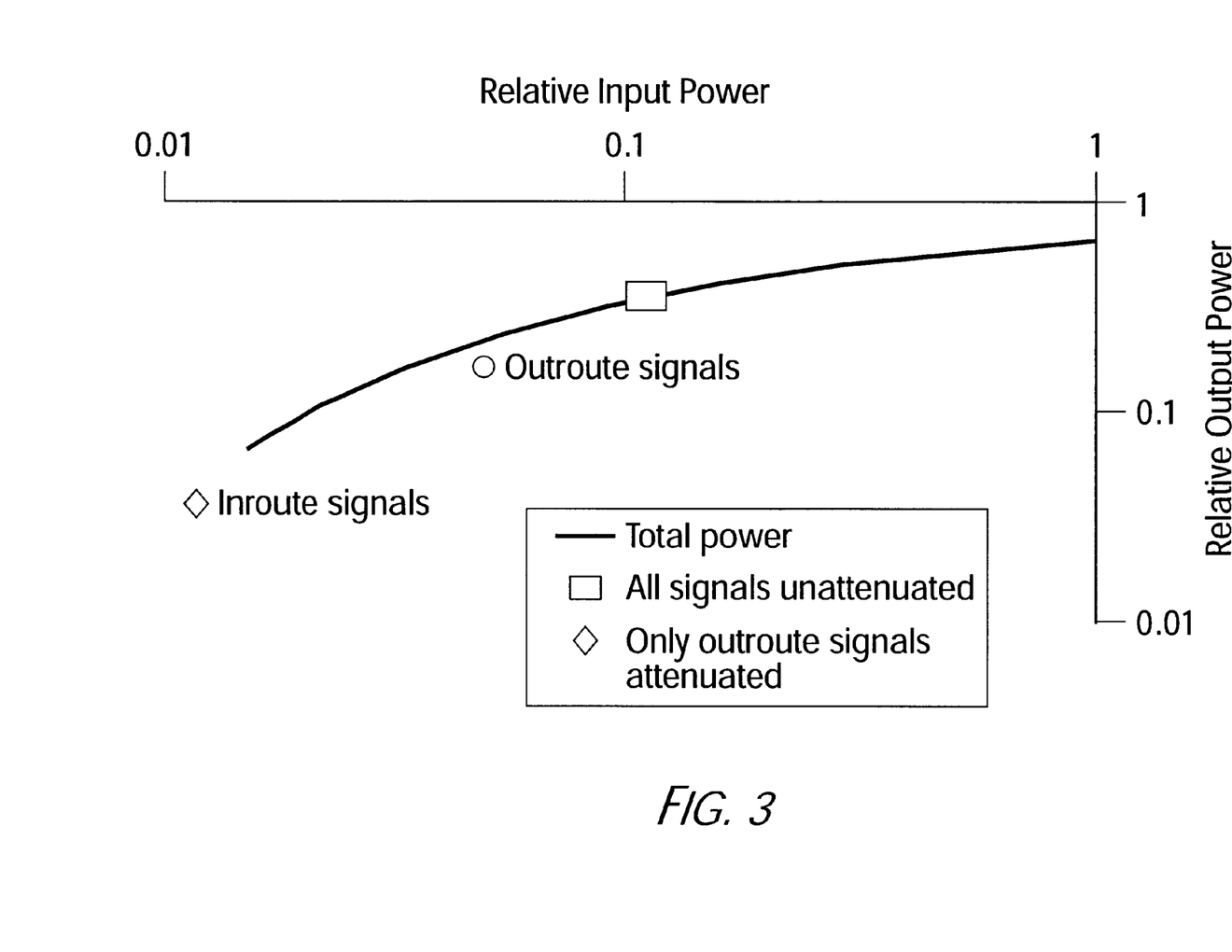
FIG. 3 shows typical transmission characteristics of a satellite transponder through its characteristic curve when operating a plurality of VSAT networks.

The proposed VSAT system concept includes the principle that different user groups within a VSAT network 1 communicate via the same central station (hub) 2. The common central station (hub) 2 not only reduces equipment and personnel costs for the individual systems, but also provides greater availability of the individual networks than in the case when the respective outroute signals are transmitted over physically separate paths. This is due to the transmission characteristics of the transponder, which is brought into the predominantly non-linear saturation range with increased input power (see FIG. 3). This favors the higher-powered (outroute) signals compared to the weaker (inroute) signals. In the case of a strong atmospheric attenuation event on the path between a central station (hub) earth-based sub-station 6, 7 and satellite 5, the corresponding outroute signals are weakened. The operating point of the transponder's characteristic curve shifts to the predominantly linear range. Thus the inroute signals, which are normally unattenuated because they are physically separated from the outroute signals, are transmitted from the satellite with higher power than in the normal case, and the attenuation effect on the downlink to central station (hub) 2 is less serious.

The above-described diversity configuration and the concept of a common hub can be used alternately to increase the availability of the VSAT network. The following measures can be taken to improve the utilization of the available transmission capacity within the VSAT network or across other networks:

1) distinguish between time-critical traffic ZKV and non-time-critical traffic ZUV;
2) assign secure transmission channels;
3) use overall effective bit rates adapted to the attenuation situation; and
4) use adaptive retransmission. These measures are preferably used to compensate for the effect of attenuation on the communication paths between the VSAT station and satellite.

The method of assigning secure transmission channels is based on the fact that when several signals are transmitted through the same transponder, there are channels of differing qualities. Quality problems result from undesirable interference signals (referred to as intermodulation products), which lead to a diminished signal/noise ratio. The intensity and frequency position of the intermodulation products are determined mainly by the high-powered outroute signals.

Figure 4:
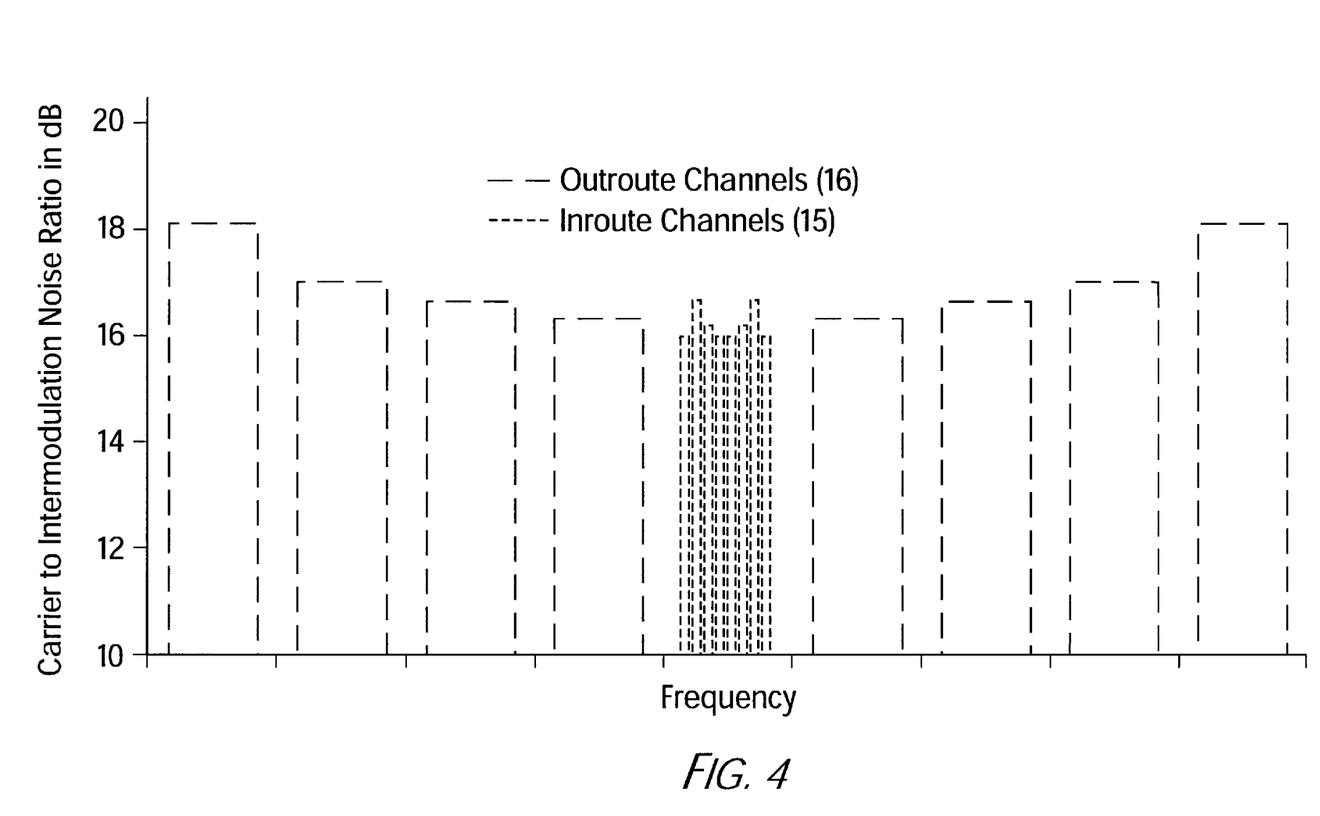
FIG. 4 shows an exemplary embodiment of the signal frequency arrangement for a transponder configuration.

The weaker inroute signals suffer the most from interference. In the case of a transponder configuration of 8 outroute and 8 inroute signals, for example, a total of 1920 third-order intermodulation products and further higher-order products are obtained. FIG. 4 shows the expected signal/noise ratio limitation by intermodulation for inroute channels 15 and outroute channels 16. In this configuration, distinction can be made between the "secure" channels with a signal/noise ratio of approximately 17 dB and the "non-secure" channels with a signal/noise ratio more than 1 dB lower. Non-secure channels are only to be used for VSAT stations without path attenuation. In the case of attenuation, a secure channel is assigned to a VSAT station 3, 4 by the central station (hub) 2, thus ensuring the availability of this link. If no more secure VSAT station channels are available when needed, this station can provide non-time-critical traffic ZUV only.

Figure 5:
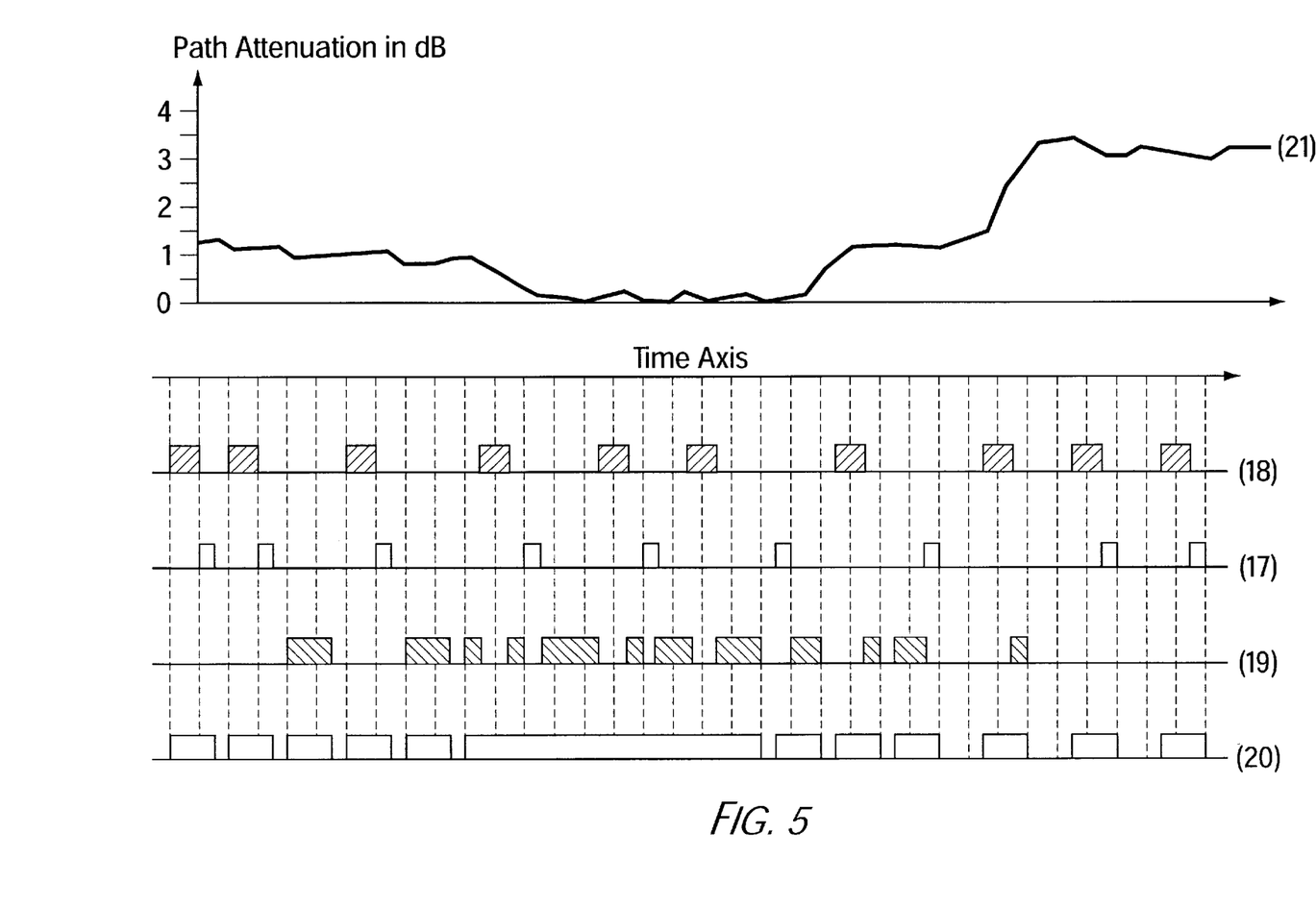
FIG. 5 shows an example of adaptive data transmission in the case of atmospheric attenuation on the satellite path.

An overall effective bit rate adapted to the attenuation situation takes advantage of the fact that the outgoing traffic from a VSAT station 3, 4 is usually not homogeneous, as schematically shown in FIG. 5. The traffic comprises "real-time services" such as voice and video transmission 17 and 18, respectively (audiovisual signal, for example, videoconferencing, videophone) and data transmission 19, which allows more or less long delays (e-mail, file transfer, fax, remote login). The power required for the correct transmission of a digital signal increases with the number of bits transmitted. In the case of path attenuation, the amount of data transmitted during a given time period can be reduced to preserve transmission quality, since, although voice and video transmission 17 and 18, respectively, require high effective bit rates, the actual bit rates vary considerably due to frequent voice pauses and video sequences with little motion. The data bits to be transmitted simultaneously are combined with the audiovisual information into a data stream of a bit rate 20 such that the signal can be transmitted just with the required quality under the prevailing propagation conditions 21. The data throughput varies with the allowed bit rate 19 at any given time and thus results in a longer transmission time.

Voice and video transmission is subject to quality standards that are different from those set for data transmission. For interactive audiovisual communication, minimum delay is desirable but greater bit error rates can still be tolerated (brief video interference can be compensated; intelligibility problems in telephone traffic can be solved by repetition). On the other hand, data services require almost error-free transmission, while minor delays normally have no importance. Audiovisual traffic is therefore protected with normal forward error correction measures, while error-free data communication when the link is affected by attenuation is ensured by adaptive retransmission.

Figure 6:
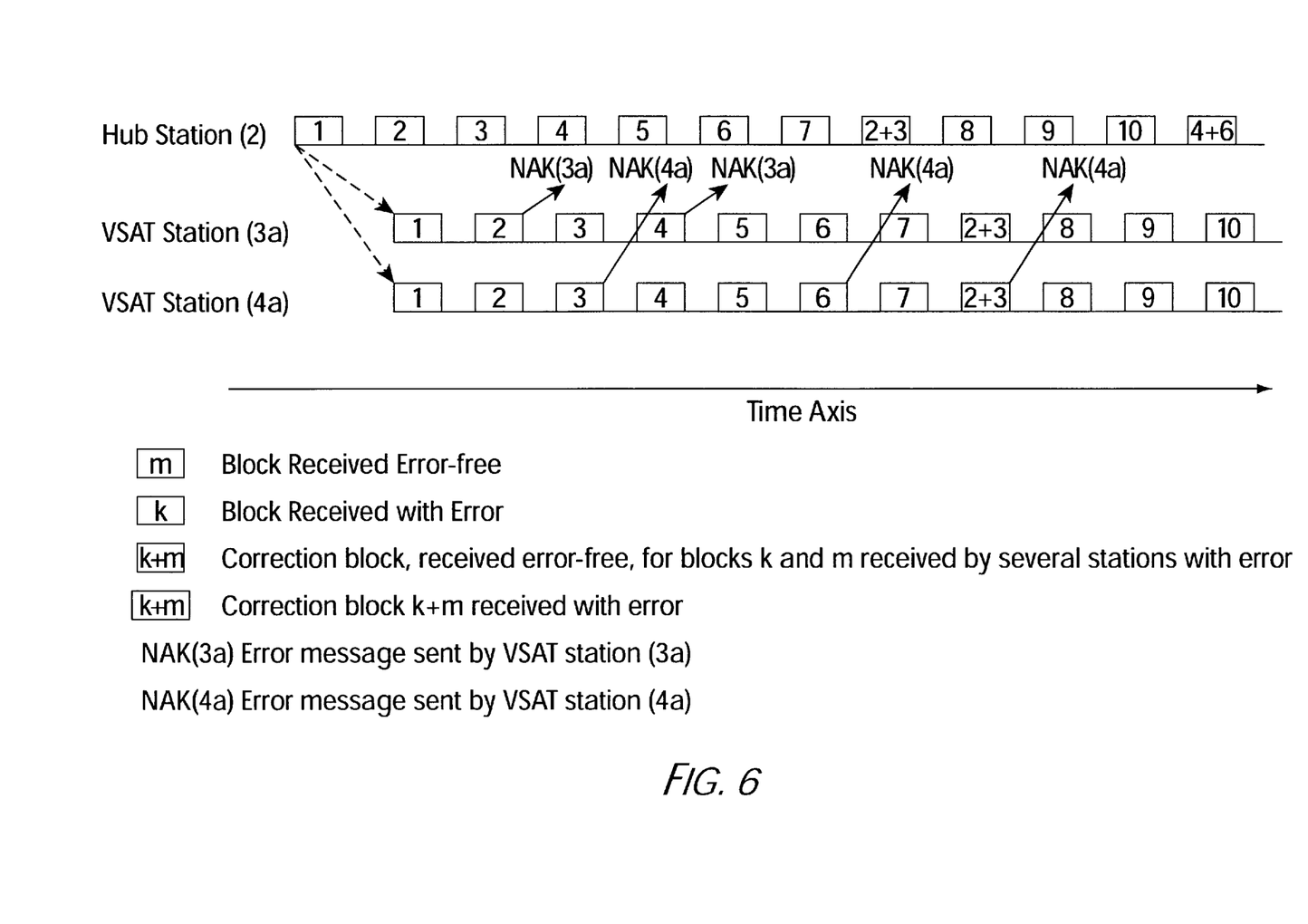
FIG. 6 shows an example of adaptive retransmission (XOR-ARQ) for point-to-multipoint links.

The ARQ method (Automatic Repeat reQuest) normally used in data transmission has the advantage of requiring additional transmission capabilities only when errors actually occur. Errors are detected by sending data in blocks together with redundant test bits (parity check). When an error is detected, retransmission is requested (NAK, Not AcKnowledged), which can be supplemented by additional error correction measures. Depending on the actual bit rate and the transmission quality, a block length and an error correction measure ensuring maximum data throughput combined with the required residual error rate can be found. This method can preferably be used in point-to-point communication between VSAT and hub (inroute) and between hub and an individual VSAT station. For point-to-multipoint transmissions, data blocks repeatedly received with errors by several stations are combined into a single "correction block" so that each station can extract the required information from the content of a number of previous, correctly received data blocks and this correction block. This principle is illustrated in FIG. 6.

Data transmission between two VSAT stations takes place via detour through the central station (hub), what is referred to as a double hop. This allows the information to be demodulated at the central station (hub) and only the correct blocks forwarded, while blocks containing errors are immediately reported back to the sender. Shorter delays and separation of the two transmission paths, and thus better data quality and more effective capacity utilization, are achieved in this manner. In the case of a strong attenuation event on the transmission path between the central station (hub) 2 and the receiving VSAT station 3, 4, temporary storage at the central station (hub) and forwarding at a more favorable time can result in further decrease in the transmission capacity load. Since strong attenuation events are usually of short duration on satellite paths, the additional delay is negligible compared to the resulting increase in effectiveness.

The apparatus and method described refer to VSAT systems performing voice, video, and data communication via satellite 5 between meshed networks including at least one central station (hub) 2 and a much larger number of remote VSAT stations 3, 4. The central station (hub) 2 sends its information to VSAT stations 3, 4 and receives the messages sent by the VSAT stations 3, 4 at other frequencies. Transmission frequencies and allowable overall bit rates are established by the central station (hub) 2 as a function of the propagation conditions prevailing on the individual satellite paths. The propagation conditions, determined by the central station (hub) 2 through receipt of its own signals and from comparison of the signal level received from the VSAT stations with the signal level transmitted by the VSAT stations, are distributed to each of the VSAT stations.

The VSAT stations transmit at the transmission frequency with the transmission parameters established by the central station (hub) 2, such as overall bit rate, block length, and error correction method. These parameters are either read from a table or determined by a dynamic process adjusted to the conditions of the specific network configuration (atmospheric conditions, allowable extent of link failure or reduced capacity utilization in relation to the optimum value). The flow chart of FIG. 7 is an example of a possible control program implemented on central station computer 8 of the central station (hub) 2.

The central station (hub) 2 forwards the data traffic between VSAT stations after checking for error-free receipt. The central station (hub) 2 communicates the telephone communication request, made by a calling VSAT station, to the called party and makes the corresponding narrow-band satellite channels available after having received reconfirmation from a called party.

Figure 7:
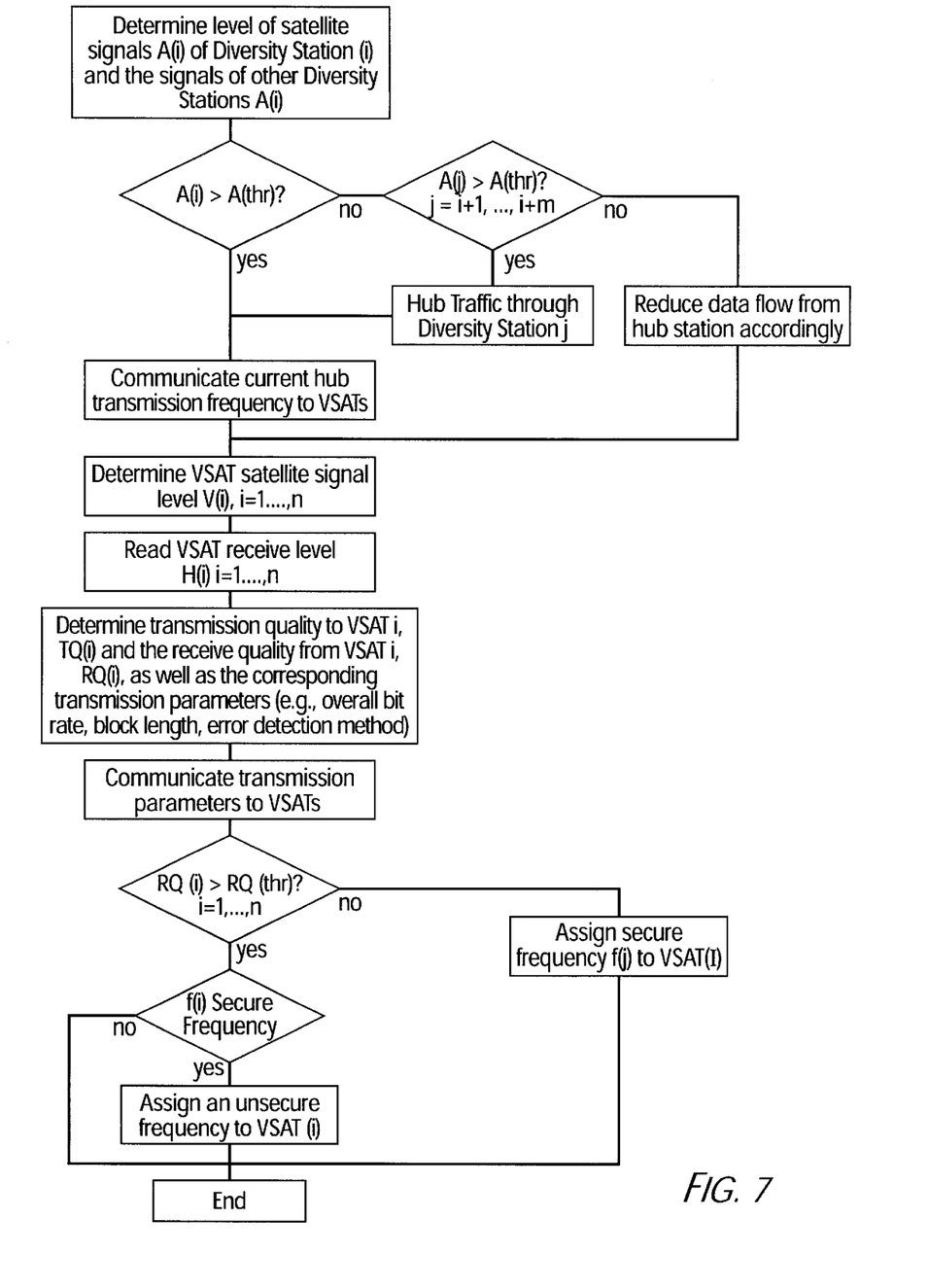
FIG. 7 shows a typical flow chart of an exemplary program for controlling adaptive measures from the central station (hub).

The flowchart of FIG. 7 provides as follows. Determine the level of satellite signals $A(i)$, $A(i)$ being the level of the satellite signal measured at diversity station i of the hub station, of the diversity station (i) and the signals of other diversity stations $A(i)$. Determine if $A(i)$ is greater than $A(thr)$, $A(thr)$ being the minimum required level of the satellite signal to meet the minimum agreed upon transmission quality at the hub station. If $A(i)$ is not greater than $A(thr)$, then determine if $A(j)$ is greater than $A(thr)$, where $j=i+1, \ldots, i+m$. If $A(j)$ is greater than $A(thr)$ then hub traffic through diversity station j and then communicate current hub transmission to VSATs. If $A(j)$ is not greater than $A(thr)$, then reduce the data flow from the hub station accordingly.

If A(i) is greater than A(thr), then communicate current hub transmission frequency to VSATs.

Next, determine the VSAT satellite signal level V(i) where i=1, ..., n. Then read H(i), where i=1, ..., n, H(i) being the level of the satellite signal transmitted by VSAT (i) received at the hub station. Then determine the transmission quality to VSAT i, TQ(i) and the receive quality from VSAT (i), RQ(i), as well as the corresponding transmission parameters, e.g., overall bit rate, block length and error detection method; TQ(i) being the transmission quality of the hub station to VSAT (i) (outroute) link, RQ(i) being the transmission quality of the VSAT (i) to the hub station (inroute) link. Then communicate the transmission parameters to VSATs. Then determine if RQ(i) is greater than RQ(thr), where i=1, ..., n; RQ(thr) being the minimum required level of the satellite signal to meet an agreed upon transmission quality at the VSAT station. If RQ(i) is greater than RQ(thr), where i=1, ..., n, then determine if secure frequency f(i) and if secure frequency f(i) then assign an unsecure frequency to VSAT (i). If RQ(i) is not greater than RQ(thr), where i=1, ..., n, then assign a secure frequency f(j) to VSAT (I).

What is claimed is:

1. A method for improving digital radio communication in a satellite-supported VSAT network having a plurality of VSAT member stations with at least one central station for voice, video, and data communication, wherein individual members and user groups can request telecommunication services which comprise signal traffic over the VSAT network, the method comprising the steps of:

classifying the signal traffic as time-critical traffic (ZKV) and non-time-critical traffic (ZV); and determining, in the central station, at least one transmission parameter of at least one satellite link of the VSAT network as a function of at least one propagation condition on at least one communication path of the signal traffic.

2. The method according to claim 1, further comprising the step of:

conducting the signal traffic via at least one earth-based sub-station of the central station that is least affected by the at least one propagation condition and/or failure of at least one system component in the central station.

3. The method according to claim 1, further comprising the step of:

assigning to the signal traffic a secure frequency at which a higher transmission quality is achieved due to lower intermodulation interference.

4. The method according to claim 3, wherein the secure frequency is a narrow-band transmission channel and through which the signal traffic takes place without a double hop.

5. The method according to claim 1, wherein the determining step includes observing a certain transmission quality for the time-critical traffic (ZKV), the method further comprising the step of:

transmitting the non-time-critical traffic (ZUV), in addition to the time-critical traffic (ZKV), when the certain transmission quality is determined to be high enough.

6. The method according to claim 5, wherein the certain transmission quality is determined as a function of a bit error rate, and that the transmitting step occurs when the bit error rate is determined to be low enough.

7. The method according to claim 5, wherein the transmitting step includes transmitting both the time-critical traffic (ZKV) and the non-time-critical traffic (ZUV) through a non-active earth-based sub-station, the method further comprising the step of:

when the certain transmission quality falls below a predefined threshold, implementing a plurality of transmission ensuring measures in order to maintain the time-critical traffic (ZKV) even with a decreased transmission quality.

8. The method according to claim 7, wherein the plurality of transmission ensuring measures includes a Fade Counter Measure.

9. The method according to claim 7, wherein the decreased transmission quality is achieved by a reduced effective data rate.

10. The method according to claim 1, wherein for at least one point-to-multipoint data transmission, the method further comprising the steps of:

combining a plurality of data blocks received by at least one VSAT station with error into a single correction block; and extracting, by at least one VSAT station, a required information from the single correction block and a plurality of previously received correct data blocks.

11. The method according to claim 10, wherein the data transmission takes place between at least two VSAT stations via the central station, the method further comprising the steps of:

demodulating the required information at the central station;

forwarding, to a receiving VSAT station, only the plurality of correct data blocks; and reporting, to a transmitting VSAT station, when at least one data block contains errors, wherein in a case of a strong attenuation event on the transmission path between the central station and the receiving VSAT station, the information is temporarily stored at the central station and is forwarded at a later, more favorable time.

12. The method according to claim 1, further comprising the steps of:

determining, at the central station, the at least one propagation condition from a reception of at least one self-emitted signal and from a comparison of a traffic signal level received from at least one VSAT station with a traffic signal level transmitted by at least one VSAT station; and distributing, to the plurality of member VSAT stations, the at least one determined propagation condition and the at least one transmission parameter as a function of the propagation condition.

13. An apparatus for improved digital radio communications in a satellite-supported VSAT network comprising:

at least one central station having a central station computer;

a plurality of member VSAT stations;

a satellite, at least one outroute signal, emitted by the central station, containing a plurality of system information, a plurality of data and audiovisual information, and a plurality of forwarded information from at least one VSAT stations, wherein the plurality of system information contains at least one transmission parameter for sending a signal traffic to the plurality of member VSAT stations; and at least one inroute signal, emitted by at least one VSAT station, containing a plurality of data and audiovisual information, a plurality of information for the plurality of member VSAT stations, and direct telephony between the VSAT stations.

wherein the central station further comprises a plurality of earth-based sub-stations arranged clearly separated from one another, each of the earth-based sub-stations having an antenna and transmission equipment in a radio frequency range for communicating with the satellite, and a plurality of terrestrial line links between each one of the earth-based sub-stations and between each one of the earth-based sub-stations and the central station computer.

14. An apparatus for improved digital radio communications in a satellite-supported VSAT network, comprising:

at least one central station having a central station computer;

a plurality of member VSAT stations; and a satellite, wherein the central station further comprises a plurality of earth-based sub-stations arranged clearly separated from one another each of the earth-based sub-stations having an antenna and transmission equipment in a radio frequency range for communicating with the satellite, and a plurality of terrestrial line links between each one of the earth-based sub-stations and between each one of the earth-based sub-stations and the central station computer, and wherein the at least one transmission parameter is stored in a memory or is determined by a control program implemented on the central station computer using an adjusted dynamic process which takes into account at least one condition of the VSAT network configuration.

15. An apparatus for improved digital radio communications in a satellite-supported VSAT network comprising:

at least one central station having a central station computer:

a plurality of member VSAT stations; and a satellite, wherein the central station further comprises a plurality of earth-based sub-stations arranged clearly separated from one another, each of the earth-based sub-stations having an antenna and transmission equipment in a radio frequency range for communicating with the satellite, and a plurality of terrestrial line links between each one of the earth-based sub-stations and between each one of the earth-based sub-stations and the central station computer, and wherein signal traffic within the VSAT network is classified as time-critical traffic (ZKV) and non-time-critical traffic (ZUV), and the central station determines at least one transmission parameter of at least one satellite link of the VSAT network as a function of at least one propagation condition on at least one communication path of the signal traffic.

16. An apparatus for improved digital radio communications in a satellite-supported VSAT network, comprising:

at least one central station having a central station computer;

a plurality of member VSAT stations; and a satellite, wherein the central station further comprises a plurality of earth-based sub-stations arranged clearly separated from one another, each of the earth-based sub-stations having an antenna and transmission equipment in a radio frequency range for communicating with the satellite, and a plurality of terrestrial line links between each one of the earth-based sub-stations and between each one of the earth-based sub-stations and the central station computer, and wherein if one of the plurality of earth-based sub-stations experiences a breakdown, a communication with the central station occurs via another one of the plurality of earth-based sub-stations.

\* \* \* \* \*